(12) United States Patent
Matsushima et al.

(10) Patent No.: US 10,882,254 B2
(45) Date of Patent: Jan. 5, 2021

(54) PRINTING DEVICE

(71) Applicant: MIMAKI ENGINEERING CO., LTD., Nagano (JP)

(72) Inventors: Takuya Matsushima, Nagano (JP); Tomoya Kawai, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 229 days.

(21) Appl. No.: 15/953,506

(22) Filed: Apr. 16, 2018

(65) Prior Publication Data
US 2018/0304535 A1    Oct. 25, 2018

(30) Foreign Application Priority Data

Apr. 24, 2017   (JP) ................. 2017-085368

(51) Int. Cl.
| | |
|---|---|
| *B29C 64/245* | (2017.01) |
| *B33Y 30/00* | (2015.01) |
| *B33Y 40/00* | (2020.01) |
| *B41M 5/00* | (2006.01) |
| *B29C 64/227* | (2017.01) |
| *B29C 64/112* | (2017.01) |
| *B29C 64/393* | (2017.01) |
| *B33Y 50/02* | (2015.01) |

(52) U.S. Cl.
CPC .......... *B29C 64/245* (2017.08); *B29C 64/112* (2017.08); *B29C 64/227* (2017.08); *B33Y 30/00* (2014.12); *B33Y 40/00* (2014.12); *B41M 5/0088* (2013.01); *B29C 64/393* (2017.08); *B33Y 50/02* (2014.12)

(58) Field of Classification Search
CPC ... B29C 64/245; B29C 64/112; B41M 5/0088
See application file for complete search history.

(56) References Cited

U.S. PATENT DOCUMENTS

| | | | |
|---|---|---|---|
| 2016/0001505 A1* | 1/2016 | Hakkaku | B41J 3/4073 264/255 |
| 2017/0239932 A1* | 8/2017 | Knecht | B33Y 30/00 |

(Continued)

FOREIGN PATENT DOCUMENTS

JP      2016043618      4/2016

*Primary Examiner* — Jacob T Minskey
*Assistant Examiner* — Adrien J Bernard
(74) *Attorney, Agent, or Firm* — JCIPRNET (57) ABSTRACT

A printing device is provided and includes: a table attaching portion, replaceably attaching a respective table of a first table for mounting a three-dimensional object and a second table including a mounting surface for mounting a medium and a plurality of pass-through holes passing through the mounting surface and a back surface on an opposite side of the mounting surface; an ejecting unit, ejecting a shaping material for shaping the three-dimensional object and a coloring material for coloring the three-dimensional object and the medium toward the table attached to the table attaching portion; a relative moving portion, relatively moving the table attaching portion and the ejecting unit in a vertical direction and a horizontal direction; and a suction portion, decompressing a side of the back surface of the second table when the second table is attached to the table attaching portion to adsorb the medium to the mounting surface.

13 Claims, 9 Drawing Sheets

(56) References Cited

U.S. PATENT DOCUMENTS

2018/0264725 A1\* 9/2018 Swartz .................. B29C 64/245
2019/0160743 A1\* 5/2019 Matsubara ............ B29C 64/205
2019/0366632 A1\* 12/2019 Tang ..................... B29C 64/236

\* cited by examiner

PRINTING DEVICE

CROSS REFERENCE TO RELATED APPLICATIONS

This application claims the priority benefit of Japanese Patent Application No. 2017-085368, filed on Apr. 24, 2017. The entirety of the above-mentioned patent application is hereby incorporated by reference herein and made a part of this specification.

TECHNICAL FIELD

The present disclosure relates to a printing device.

DESCRIPTION OF THE BACKGROUND ART

A three-dimensional shaping device is known for a printing device for forming a three-dimensional object. The three-dimensional shaping device ejects a liquid shaping material from a head onto a working surface, and layers the shaping material to shape a three-dimensional object. On the other hand, an inkjet type image forming device that injects droplets from the head onto a medium, for example, is known as a printing device for forming an image with respect to a medium such as fabric, paper, and the like. Furthermore, a printing device capable of carrying out an operation of shaping the three-dimensional object and an operation of forming the image on the medium with one device is known (see e.g., Japanese Unexamined Patent Publication No. 2016-043618).

Patent Literature: Japanese Unexamined Patent Publication No. 2016-043618

SUMMARY

In the printing device described in Japanese Unexamined Patent Publication No. 2016-043618, it is desired to form an image on the medium at high accuracy in addition to forming the three-dimensional object at high accuracy.

In view of the above, the present disclosure provides a printing device capable of forming a three-dimensional object at high accuracy and capable of forming an image on a medium at high accuracy with one device.

A printing device according to the present disclosure includes: a table attaching portion that replaceably attaches a respective table of a first table and a second table, wherein the first table is for mounting a three-dimensional object, and the second table includes a mounting surface for mounting a medium and a plurality of pass-through holes, which pass through the mounting surface and a back surface on an opposite side of the mounting surface; an ejecting unit that ejects a shaping material for shaping the three-dimensional object and a coloring material for coloring the three-dimensional object and the medium toward the table attached to the table attaching portion; a relative moving portion that relatively moves the table attaching portion and the ejecting unit in a vertical direction and a horizontal direction; and a suction portion that decompresses a side of the back surface of the second table when the second table is attached to the table attaching portion to adsorb the medium to the mounting surface.

According to the present disclosure, the three-dimensional object can be formed at high accuracy by attaching the first table to the table attaching portion when shaping the three-dimensional object. Furthermore, when ejecting the coloring material to the medium, the second table can be attached instead to the table attaching portion. In this case, the coloring material can be ejected to the medium while the medium is being adsorbed to the mounting surface by the suction portion, and whereby the positional shift of the medium with respect to the second table can be suppressed. Thus, the image can be formed at high accuracy with respect to the medium. Therefore, the three-dimensional object can be formed at high accuracy and the image can be formed on the medium at high accuracy with one device.

Furthermore, the table attaching portion may include a positioning portion that positions a space between the first table and the second table.

According to the present disclosure, the space between the first table as well as the second table and the table attaching portion is positioned by the positioning portion, and whereby the first table and the second table can be attached at satisfactory accuracy even when replacing the table.

Furthermore, the suction portion may be arranged integrally with the second table.

According to the present disclosure, when detaching the second table, the second table can be integrally detached with the suction portion. Thus, when attaching the first table to the table attaching portion, the table attaching portion can be made lighter.

Furthermore, the second table may include a table side connector to be electrically connected to the suction portion; and the table attaching portion may include an attaching portion side connector at a position to be connected to the table side connector when the second table is attached.

According to the present disclosure, the table side connector is connected to the attaching portion side connector by attaching the second table to the table attaching portion, and hence the table attaching portion side and the second table side can be easily electrically connected.

Furthermore, the suction portion may be arranged integrally with the table attaching portion.

According to the present disclosure, the second table can be made lighter as the suction portion and the table attaching portion are integrally arranged, and thus the attachment/detachment operation of the second table can be easily carried out.

Furthermore, the suction portion may include a decompression chamber disposed over a region where the plurality of pass-through hole are formed in the back surface of the second table, and a decompression portion for decompressing the decompression chamber.

According to the present disclosure, the plurality of pass-through holes can be suctioned with an even pressure by decompressing the decompression chamber with the decompression portion.

Moreover, a table detection portion that detects whether a table attached to the table attaching portion is the first table or the second table may be further disposed.

According to the present disclosure, for example, the operation of the user to input the table attached to the table attaching portion becomes unnecessary by detecting whether the table attached to the table attaching portion is the first table or the second table.

Furthermore, a control device that controls at least one of the ejecting unit, the table attaching portion, the relative moving portion, and the suction portion based on a detection result of the table detection portion may be further disposed.

According to the present disclosure, at least one of the ejecting unit, the table attaching portion, the relative moving portion, and the suction portion is controlled based on the detection result of detecting the table attached to the table attaching portion, and thus the shaping of the three-dimensional object and the formation of the image on the medium can be efficiently carried out.

According to one aspect of the present disclosure, the three-dimensional object can be formed at high accuracy and the image can be formed on the medium at high accuracy with one device.

DETAILED DESCRIPTION OF EMBODIMENTS

Hereinafter, an embodiment of a printing device according to the present disclosure will be described in detail based on the drawings. The present disclosure is not limited by such embodiment. Components in the following embodiment include components that can be replaced by those skilled in the art and are easy, or are substantially the same.

First Embodiment

Figure 1:
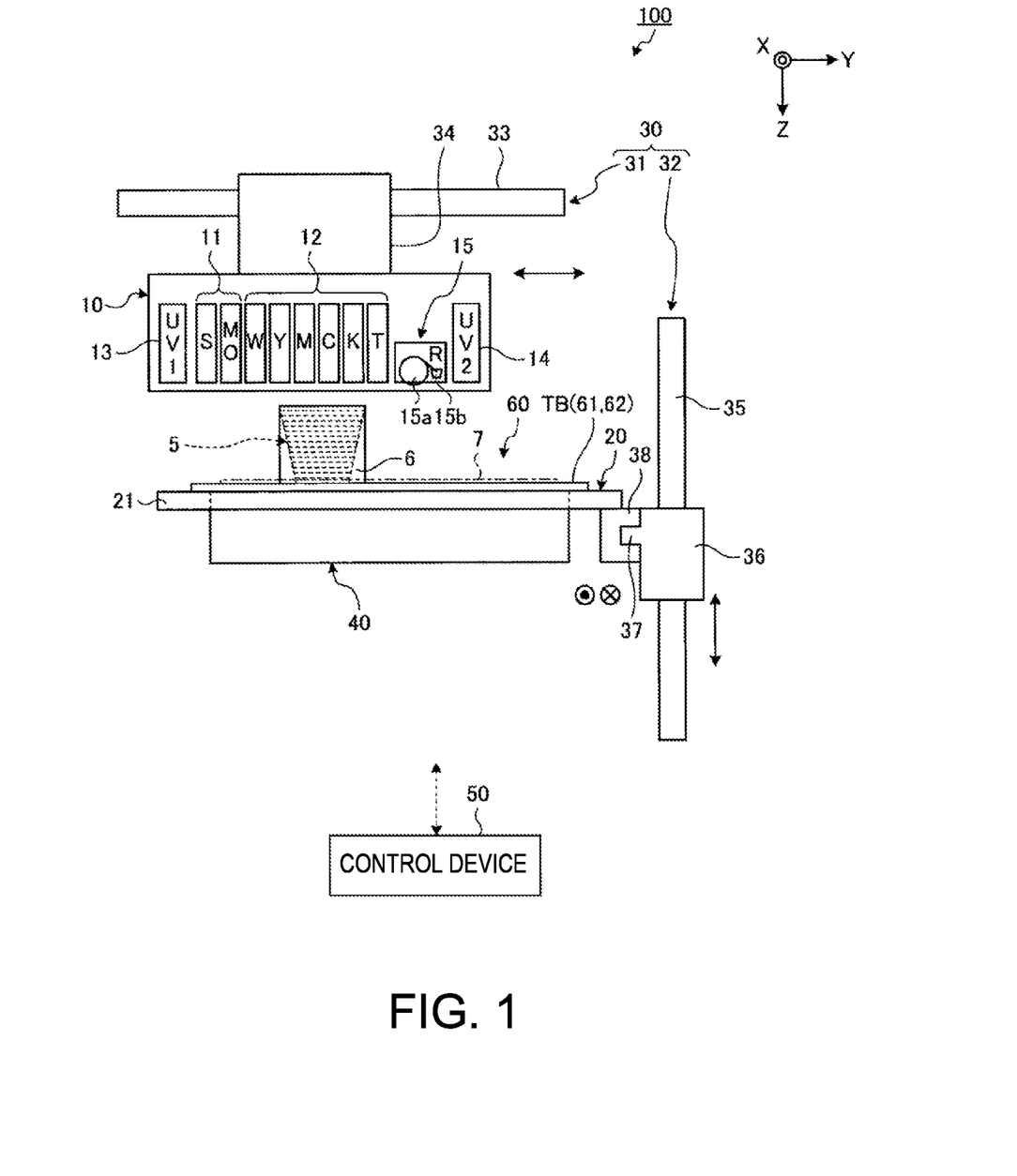
FIG. 1 is a schematic view showing one example of a printing device according to a first embodiment.

FIG. 1 is a schematic view showing one example of a printing device according to a first embodiment. A printing device 100 shown in FIG. 1 carries out a three-dimensional object shaping operation of shaping a three-dimensional object 5 through a layering and shaping method, and an image forming operation of forming a two-dimensional image on a medium 7. In this case, the layering and shaping method is a method of shaping the three-dimensional object 5 by overlapping a plurality of layers. The three-dimensional object 5 is, for example, a three-dimensional structural object. The three-dimensional object shaping operation executed in the printing device 100 may, for example, perform coloring on the three-dimensional object 5. The three-dimensional object shaping operation includes an operation of forming irregularities on a plane without using a support 6, that is, a so-called 2.5 dimensional operation between the image forming operation and the three-dimensional object shaping operation. Furthermore, the medium 7 may be a sheet-like medium such as a paper, a fabric, a film, and the like or may be a plate-like medium such as a disc.

The printing device 100 includes an ejecting unit 10, a table attaching portion 20, a relative moving portion 30, a suction portion 40, and a control device 50. The ejecting unit 10, the table attaching portion 20, the relative moving portion 30, and the suction portion 40 are accommodated in an interior space of a housing (not shown). The interior space may be, for example, sealed with respect to the device exterior. In the present embodiment, the table attaching portion 20, the suction portion 40, and a table TB configure a mounting table 60.

The ejecting unit 10 is movable in a main scanning direction (Y direction in the figure). The ejecting unit 10 includes a shaping material ejecting portion 11, a coloring material ejecting portion 12, ultraviolet light irradiating portions 13, 14, and a flattening portion 15. The shaping material ejecting portion 11 ejects a droplet containing a shaping material for shaping the three-dimensional object 5. The shaping material ejecting portion 11, for example, ejects the droplet and the like of a curable resin, which is resin cured according to a predetermined condition, and cures the resin to form each layer configuring the three-dimensional object 5. More specifically, the shaping material ejecting portion 11, for example, ejects the droplet in response to an instruction of the control device 50 to repeatedly carry out a layer forming operation of forming a layer of curable resin and a curing operation of curing the layer of curable resin formed in the layer forming operation over plural times. The shaping material ejecting portion 11 forms a plurality of cured layers of curable resin in an overlapping manner by repeatedly carrying out such operations.

An ultraviolet curable resin, and the like that cures when irradiated with the ultraviolet light, for example, is used for the curable resin ejected from the shaping material ejecting portion 11. In this case, the shaping material ejecting portion 11 ejects, for example, an ink droplet of the ultraviolet curable ink as a droplet to become the material of the three-dimensional object 5. Furthermore, in the curing operation, the layer of curable resin is cured by being irradiated with the ultraviolet light from the ultraviolet light source. In this case, the layer of curable resin refers to an ultraviolet curable ink.

Moreover, the shaping material ejecting portion 11 ejects a support material for forming the support 6 that supports one portion of the three-dimensional object 5 at the time of the shaping of the three-dimensional object 5. The support 6 is a layered structural object (support layer) for supporting the three-dimensional object 5 being shaped, and is dissolved and removed with water, and the like after the shaping of the three-dimensional object 5 is completed.

The coloring material ejecting portion 12 ejects liquid containing a coloring material for coloring a target object including the three-dimensional object 5 and the medium 7. The coloring material ejecting portion 12, for example, ejects the droplet and the like of a curable resin, which is resin cured according to a predetermined condition, and cures the resin to form a layer of droplet on the target object. More specifically, the coloring material ejecting portion 12, for example, ejects the droplet in response to an instruction of the control device 50 to repeatedly carry out a layer forming operation of forming a layer of curable resin and a curing operation of curing the layer of curable resin formed in the layer forming operation over plural times. The coloring material ejecting portion 12 planarly arranges the cured layer of curable resin by repeatedly carrying out such operations.

Similar to the shaping material ejecting portion 11, an ultraviolet curable resin, and the like, for example, is used for the curable resin discharged from the coloring material ejecting portion 12. In this case, the coloring material ejecting portion 12 ejects, for example, an ink droplet of the ultraviolet curable ink as a droplet for forming an image.

Furthermore, in the curing operation, the layer of curable resin is cured by being irradiated with the ultraviolet light from the ultraviolet light source. In this case, the layer of curable resin refers to an ultraviolet curable ink. The coloring material ejecting portion 12 can form a colored image on a surface of the target object by ejecting an ink droplet of a colored ultraviolet curable ink.

Figure 2:
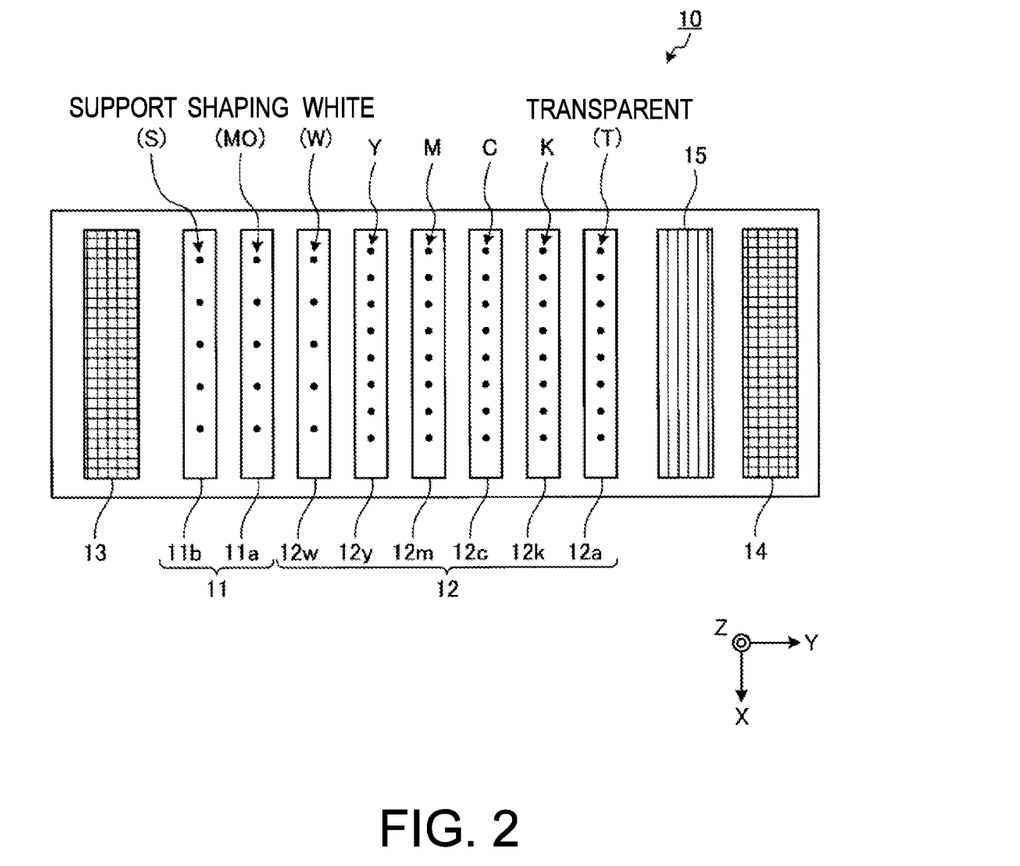
FIG. 2 is a view showing a state in which an ejecting unit is seen from a droplet ejecting surface side.

FIG. 2 is a view showing a state in which the ejecting unit 10 is seen from a droplet ejecting surface side. As shown in FIG. 2, the inkjet shaping material ejecting portion 11 includes a shaping material ejecting head 11a and a support material ejecting head 11b. The shaping material ejecting head 11a and the support material ejecting head 11b are inkjet heads that discharge an ink droplet of an ultraviolet curable ink. The shaping material ejecting head 11a is an inkjet head that ejects an ink droplet of an ultraviolet curable ink to be used as the shaping material having fluidity for forming the three-dimensional object 5. The shaping material ejecting head 11a can discharge an ink droplet of a shaping ink (MO) of a predetermined color. A white ink, a clear ink, or the like, for example, may be used for the shaping ink. The support material ejecting head 11b is an inkjet head that ejects an ink droplet containing the support material of the support 6 (see FIG. 1). The support material in this case preferably uses a water soluble material that can be dissolved with water after the three-dimensional object 5 is shaped. A known material for the support 6 may be appropriately used for the support material.

The coloring material ejecting portion 12 includes a plurality of colored ink heads 12y, 12m, 12c, 12k (hereinafter described as a plurality of colored ink heads 12y to 12k), a white ink head 12w, and a clear ink head 12a. The plurality of colored ink heads 12y to 12k, the white ink head 12w, and the clear ink head 12a are inkjet heads that discharge an ink droplet of an ultraviolet curable ink.

The colored ink heads 12y to 12k are inkjet heads that respectively discharge an ink droplet of a colored ink of a color different from each other. The colored ink head 12y can discharge an ink droplet of a yellow ultraviolet curable ink. The colored ink head 12m can discharge an ink droplet of a magenta ultraviolet curable ink. The colored ink head 12c can discharge an ink droplet of a cyan ultraviolet curable ink. The colored ink head 12k can discharge an ink droplet of a black ultraviolet curable ink. The white ink head 12w ejects an ink droplet of a white ultraviolet curable ink. The clear ink head 12a ejects an ink droplet of an ultraviolet curable clear ink. The clear ink is a clear colored, or a transparent ink, and is a colorless transparent ink. The clear ink is an ink that contains an ultraviolet curable resin and that does not contain a colorant.

Each head is arranged to be lined in a main scanning direction (Y direction) with the positions in a sub-scanning direction (X direction) aligned. Each head is connected to an ink supplying source (not shown) by way of a predetermined ink flowing path. The ink supplying source may be, for example, a cartridge type that can be detachably attached with respect to the printing device 100 or may have a configuration of being attached to an exterior of the printing device 100. Each head is supplied with ink from the ink supplying source through the ink flowing path. The ink flowing path includes, for example, a sub-tank (not shown).

A known inkjet head, for example, can be suitably used for each head. Such inkjet heads include a nozzle row in which a plurality of nozzles are lined in the sub-scanning direction on a surface facing the mounting table 60 (see FIG. 1 etc.). The nozzle row in each inkjet head has the same arrangement direction and is parallel to each other. Furthermore, at the time of the main scanning operation, the ink droplet is ejected in a Z direction toward the table TB while moving in the main scanning direction orthogonal to the direction in which the nozzles are lined.

The ultraviolet light irradiating portions 13, 14 are light sources of an ultraviolet light for curing the ultraviolet curable ink, and an ultraviolet LED (Light Emitting Diode), a metal halide lamp, a mercury lamp, and the like can be used. The ultraviolet light irradiating portions 13, 14 can adjust the illuminance. Furthermore, the ultraviolet light irradiating portions 13, 14 can irradiate the ultraviolet light of a plurality of wavelengths different from each other.

The ultraviolet light irradiating portions 13, 14 are respectively disposed at one end side and the other end side in the main scanning direction in the ejecting unit 10 so as to sandwich each head. In the printing device 100 of the present embodiment, the ultraviolet light irradiating portion 13 is disposed at one end side of the ejecting unit 10 in the main scanning direction (Y direction), and the ultraviolet light irradiating portion 14 is disposed at the other end side of the ejecting unit 10 in the main scanning direction (Y direction).

The flattening portion 15 flattens the layer of ultraviolet curable ink formed during the shaping of the three-dimensional object 5. The flattening portion 15 is disposed between the clear ink head 12a and the ultraviolet light irradiating portion 14. Thus, the flattening portion 15 is arranged lined in the main scanning direction with the positions in the sub-scanning direction aligned with respect to the arrangement of each head. The flattening portion 15 is disposed to be movable in an up and down direction with respect to the ejecting unit 10. The flattening portion 15 includes a freely rotatable flattening roller 15a for scraping off an extra shaping material in the flowable shaping material that moved in the main scanning direction (Y direction in the figure) with the carriage 34 (see FIG. 1), and an extra shaping material collecting mechanism 15b (see FIG. 1) for collecting the extra shaping material scraped off by the flattening roller 15a.

Figure 3:
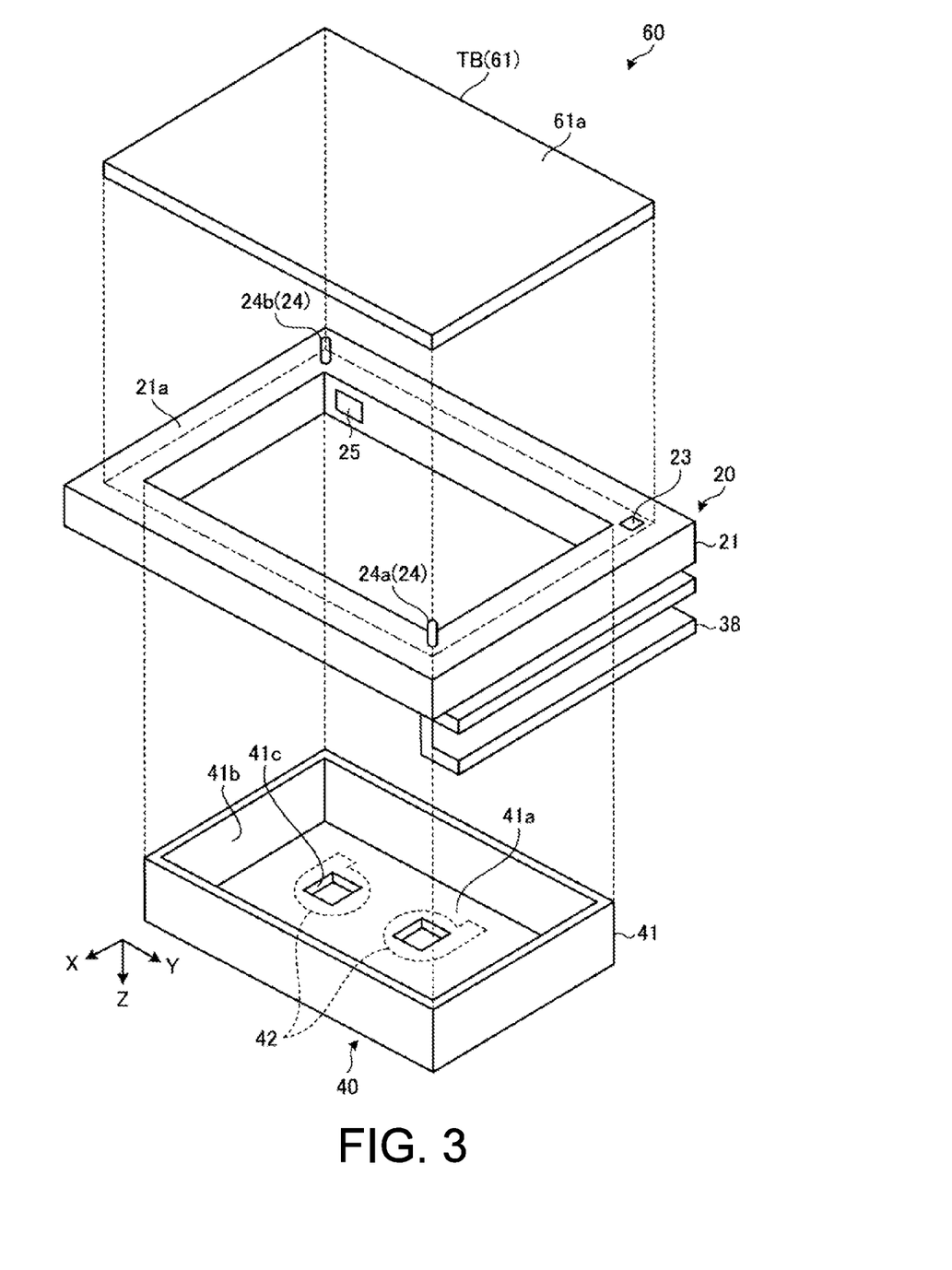
FIG. 3 is an exploded perspective view showing one example of a mounting table according to the present embodiment.
Figure 4:
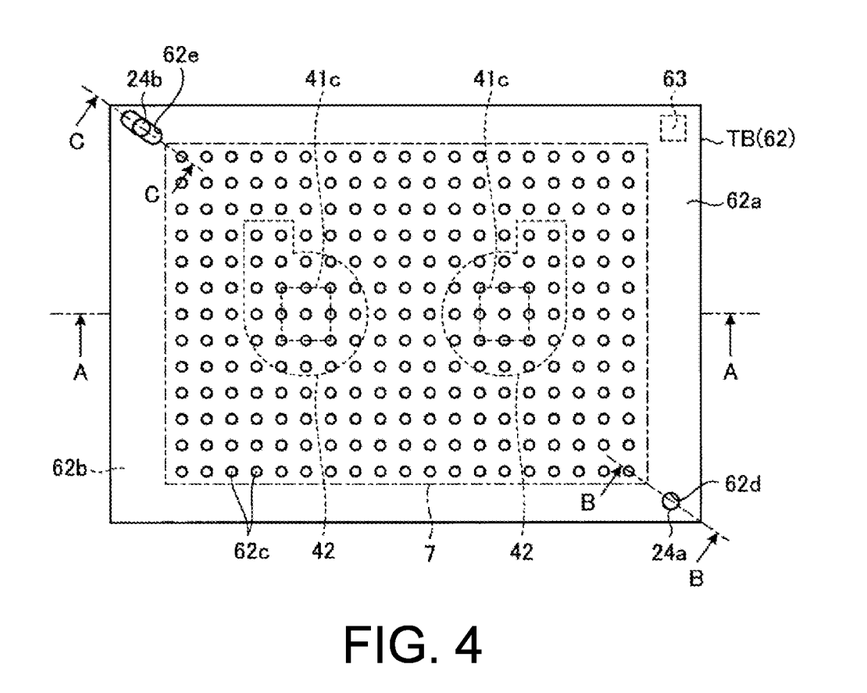
FIG. 4 is a plan view showing one example of the mounting table according to the present embodiment.
Figure 5:
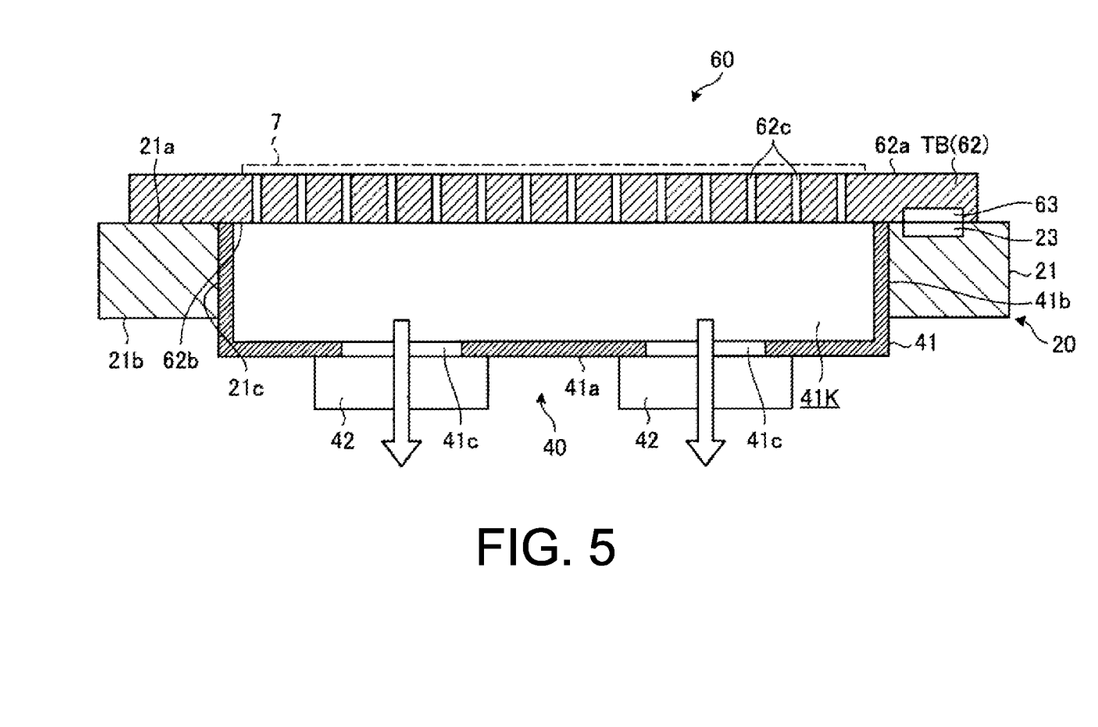
FIG. 5 is a cross-sectional view showing one example of the mounting table according to the present embodiment, and is a view showing a configuration taken along an A-A cross-section in FIG. 4.
Figure 6:
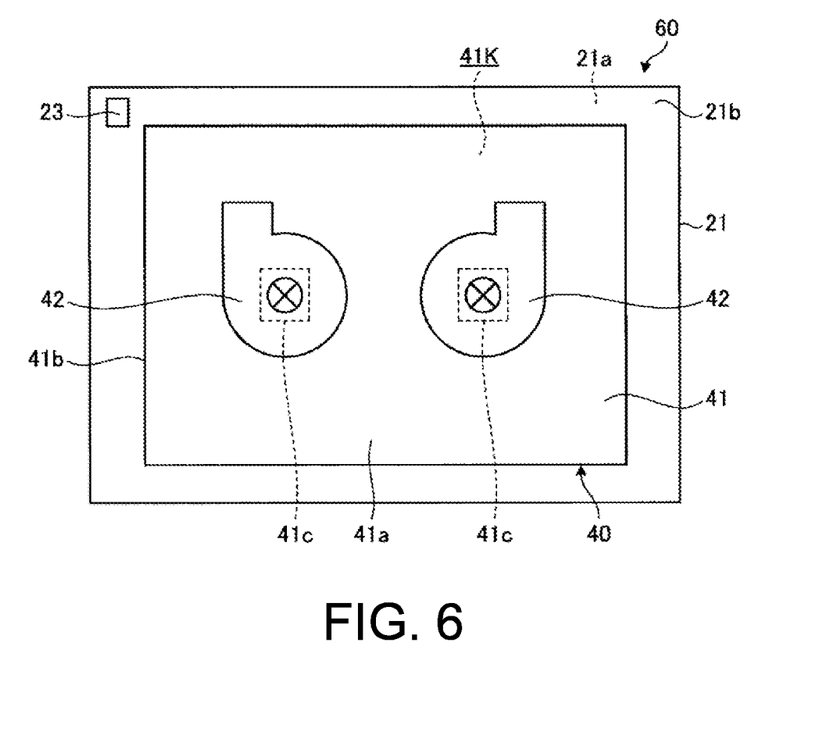
FIG. 6 is a bottom view showing one example of the mounting table according to the present embodiment.

FIG. 3 is an exploded perspective view showing one example of the mounting table 60 according to the present embodiment. FIG. 4 is a plan view showing one example of the mounting table 60 according to the present embodiment. FIG. 5 is a cross-sectional view showing one example of the mounting table 60 according to the present embodiment, and is a view showing a configuration taken along a A-A cross-section in FIG. 4. FIG. 6 is a bottom view showing one example of the mounting table 60 according to the present embodiment. In FIG. 3, a configuration in which a first table 61 is attached as the table TB is shown. In FIGS. 4 to 6, a configuration in which a second table 62 is attached as the table TB is shown by way of example.

As shown in FIG. 1 and FIGS. 3 to 6, the table attaching portion 20 replaceably attaches the respective table TB of the first table 61 and the second table 62. The first table 61 and the second table 62 are, for example, formed to the same dimension, but this is not the sole case, and may be formed to different dimensions.

The first table 61 mounts the three-dimensional object 5. The first table 61 has a plate-shape, for example, and includes a planar mounting surface 61a. The first table 61 is used by being attached to the table attaching portion 20 when carrying out the three-dimensional object shaping operation of shaping the three-dimensional object 5.

The second table 62 mounts the medium 7. The second table 62 is used by being attached to the table attaching portion 20 when carrying out the image forming operation of forming the image on the medium 7. The second table 62 has a plate shape, for example, and includes a planar medium mounting surface 62a, and a back surface 62b on the opposite side of the medium mounting surface 62a. The second table 62 includes a plurality of pass-through holes 62c that pass through the medium mounting surface 62a and the back surface 62b. The plurality of pass-through holes 62c are provided over substantially the entire surface of a region for mounting the medium 7.

The second table 62 includes positioning holes 62d, 62e. The positioning holes 62d, 62e are formed to pass through the medium mounting surface 62a and the back surface 62b of the second table 62. The positioning hole 62d is a round hole, for example, and is disposed at one of the four corners of the second table 62. The positioning hole 62e is a long hole, for example, and is disposed at a corner diagonal from the corner where the positioning hole 62d is disposed of the four corners of the second table 62. The positioning hole 62e is extended from the corner side toward the central part side of the second table 62. In addition to the positioning holes 62d, 62e, the second table 62 may be formed with a through-hole at each of the remaining corners of the second table 62.

One table TB of the first table 61 and the second table 62 can be attached to the table attaching portion 20. The table attaching portion 20 replaceably attaches the respective table TB of the first table 61 and the second table 62. When one of the first table 61 or the second table 62 is attached to the table attaching portion 20, the other table is not attached.

The table attaching portion 20 includes a beam-like member 21. The beam-like member 21 is formed to a rectangular annular shape. The beam-like member 21 may be formed by one member, or may be formed by combining a plurality of members. The beam-like member 21 includes an attaching surface 21a for attaching the table TB. The attaching surface 21a is, for example, formed to a planar shape. The attaching surface 21a includes an attaching portion side connector 23. The attaching portion side connector 23 is disposed at a position to be connected to a table side connector 63 when the second table 62 is attached. In the present embodiment, the attaching portion side connector is disposed at one of the four corners of the mounting surface 21a.

Furthermore, the attaching surface 21a includes a positioning portion 24. The positioning portion 24 includes protruding portions 24a, 24b. The protruding portions 24a, 24b are disposed at two opposing corners of the four corners of the attaching surface 21a. In the present embodiment, the protruding portion 24a is disposed at one of the two opposing corners, and the protruding portion 24b is disposed at the other one of the two opposing corners. The disposition of the protruding portions 24a, 24b is not limited to the above, and may be disposed at other areas such as, for example, portion along four sides of the attaching surface 21a. The attaching portion side connector 23 may be used as a positioning portion. When the second table 62 includes the through-hole described above separate from the positioning holes 62d, 62e, the protruding portion may be disposed at a position corresponding to each through-hole.

Figure 7:
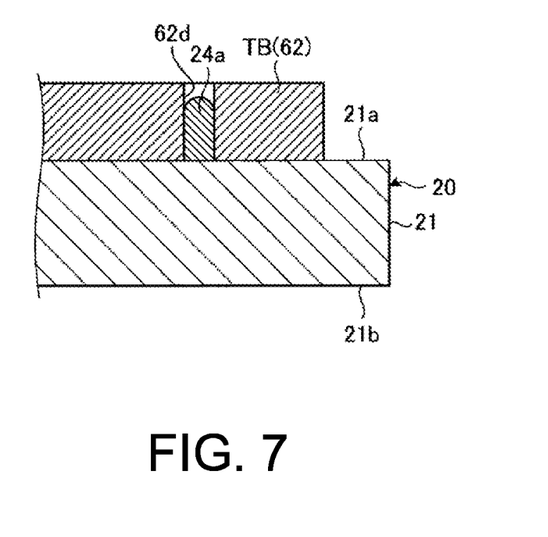
FIG. 7 is a view showing a configuration taken along a B-B cross-section in FIG. 4.

FIG. 7 is a view showing a configuration taken along a B-B cross-section in FIG. 4. As shown in FIG. 7, the protruding portion 24a is inserted to the positioning hole 62d of the second table 62. The protruding portion 24a is formed to a diameter substantially equal to the diameter of the positioning hole 62d. Thus, when the second table 62 is attached to the attaching surface 21a, the protruding portion 24a is inserted to the positioning hole 62d without substantially any gap therebetween.

Figure 8:
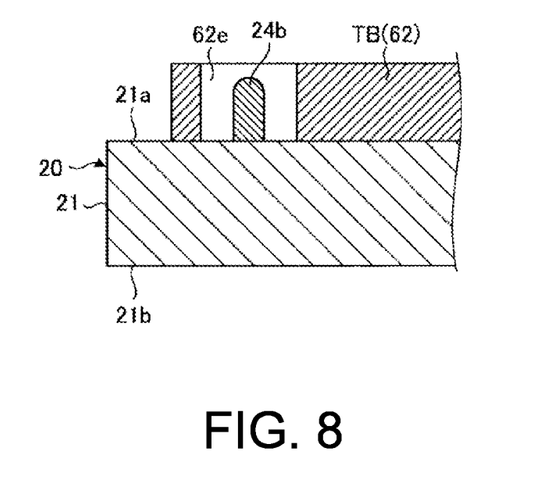
FIG. 8 is a view showing a configuration taken along a C-C cross-section in FIG. 4.

FIG. 8 is a view showing a configuration taken along a C-C cross-section in FIG. 4. As shown in FIG. 8, the protruding portion 24b is inserted to the positioning hole 62e of the second table 62. The protruding portion 24b is formed to a diameter substantially equal to a width in a short side direction of the positioning hole 62e. Thus, when the second table 62 is attached to the attaching surface 21a, the protruding portion 24b is inserted to the positioning hole 62e without substantially any gap therebetween in the short side direction. Since the positioning hole 62e is a long hole, the protruding portion 24b can be reliably inserted to the positioning hole 62e even if there is a position error of the protruding portion 24b for every second table 62. Thus, the positioning can be carried out at high accuracy.

Furthermore, as shown in FIG. 3, the table attaching portion 20 includes a table detection portion 25. The table detection portion 25 detects whether or not the table TB attached to the table attaching portion 20 is the first table 61 or the second table 62. A feature portion that can be detected by the table detection portion 25 is formed in advance in the first table 61 and the second table 62. For example, when using an optical sensor including a light emitting portion and a light receiving portion as the table detection portion 25, a light shielding portion for shielding the light from the light emitting portion is formed in one of the first table 61 or the second table 62. In such configuration, the light is emitted from the light emitting portion with the attachment of the first table 61 and the second table 62 as a trigger, and the relevant light or the reflected light is detected by the light receiving portion. In this case, which one of the first table 61 or the second table 62 is attached can be detected for when the light is detected and when the light is not detected by the light receiving portion. The table detection portion 25 is not limited to the optical sensor, and may be other types of sensors such as a magnetic sensor or may be a mechanical switch, and the like.

Then, as shown in FIG. 1, the relative moving portion 30 includes an ejecting unit driving portion 31 and a mounting table driving portion 32. The ejecting unit driving portion 31 includes a guide rail 33 and a carriage 34. The guide rail 33 has, for example, a rod-shape, and is disposed parallel to the main scanning direction (Y direction). The carriage 34 is a holding portion for holding the ejecting unit 10 while facing the mounting table 60. In other words, the carriage 34 holds the ejecting unit 10 so that the ejecting direction of the ink droplet ejected from the ejecting unit 10 is a direction toward the mounting table 60. The carriage 34 is connected to the guide rail 33, and is guided on the guide rail 33 by a driving source (not shown) to be moved in the main scanning direction (Y direction) while holding the ejecting unit 10.

The mounting table driving portion 32 includes a Z guide bar 35, a Z moving body 36, an X guide 37, and an X moving body 38. The Z guide bar 35 has a rod-shape, and is disposed parallel to a vertical direction (Z direction). The Z moving body 36 is connected to the Z guide bar 35. The Z moving body 36 is guided on the Z guide bar 35 by a driving source (not shown) to be moved in the vertical direction (Z direction).

The X guide 37 is integrally arranged with the Z moving body 36. The X guide 37 is disposed parallel to the sub-scanning direction (X direction). The X moving body 38 is fixed to the beam-like member 21. The X moving body 38 is connected to the X guide 37, and is guided on the X guide 37 by a driving source (not shown) to be moved in the X direction. When the X moving body 38 is moved in the sub-scanning direction (X direction), the beam-like member 21 is moved in the X direction integrally with the X moving body 38.

Next, as shown in FIGS. 1, 3, 5, and 6, the suction portion 40 is arranged integrally with the second table 62. The suction portion 40 includes a decompression chamber forming member 41 and a fan 42. The decompression chamber forming member 41 is fixed to the back surface 62b of the second table 62. The decompression chamber forming member 41 has, for example, a rectangular box-shape, and includes a bottom portion 41a and a side portion 41b. The bottom portion 41a has, for example, a flat plate shape. The bottom portion 41a is formed with an opening 41c. The opening 41c is formed to pass through the bottom portion 41a. The opening 41c has a rectangular shape, for example, but is not limited thereto, and may be other shapes. The opening 41c is, for example, formed in plurals (two in the present embodiment) in the bottom portion 41a. One opening 41c may be formed, or three or more openings may be formed. The side portion 41b has, for example, a rectangular annular shape, and is fixed to the back surface 62b of the second table 62. The decompression chamber forming member 41 forms a decompression chamber 41K between the bottom portion 41a, the side portion 41b, and the back surface 62b of the second table 62. The decompression chamber 41K is, for example, formed in a range connected to the plurality of pass-through holes 62c of the second table 62.

The fan 42 is attached to the bottom portion 41a of the decompression chamber forming member 41. The fan 42 is arranged at a position corresponding to each opening 41c. The fan 42 suctions the decompression chamber 41K from the opening 41c. The entire decompression chamber 41K is evenly decompressed by suctioning the decompression chamber 41K with the fan 42. Thus, the suction force can be made even among the plurality of pass-through holes 62c of the second table 62. Each fan 42 is electrically connected to the table side connector 63 by, for example, a wiring, and the like (not shown). Therefore, each fan 42 is connected to a power supply of the printing device 100 by way of the attaching portion side connector 23 connected to the table side connector 63. The printing device 100 includes, for example, an activation switch (not shown) for activating the fan 42. The printing device 100 activates each fan 42 when the activation switch is manually turned ON, and stops each fan 42 when the activation switch is manually turned OFF.

Next, an operation of the above printing device 100 will be described. First, a case of carrying out the three-dimensional object shaping operation will be described. In this case, the first table 61 is attached to the table attaching portion 20 in advance. When the first table 61 is attached to the table attaching portion 20, the table detection portion 25 determines that the table TB attached to the table attaching portion 20 is the first table 61, and transmits the determination result to the control device 50. The control device 50 causes the Z position of the mounting surface 61a of the first table 61 to be adjusted by the relative moving portion 30 based on the determination result. For example, the control device 50 makes the adjustment such that the Z position of the mounting surface 61a of the first table 61 becomes an initial position. The initial position is stored in advance in a storage portion of the control device 50. When three-dimensional data is input from an external device, for example, in this state, the control device 50 sets an initial shaping condition based on the input three-dimensional data, and causes the three-dimensional object shaping operation to be carried out according to the shaping condition.

In the three-dimensional object shaping operation, the control device 50 moves the mounting table 60 in the X direction and the Z direction, and moves the carriage 34 in the Y direction to relatively move the ejecting unit 10 and the first table 61. The control device 50 then ejects the droplet from the ejecting unit 10 to shape the three-dimensional object 5 on the mounting surface 61a of the first table 61.

Next, a case of carrying out an image forming operation will be described. In this case, the second table 62 is attached to the table attaching portion 20 in advance. When attaching the second table 62 to the table attaching portion 20, the suction portion 40 integrally arranged with the second table 62 is first inserted to the interior of the beam-like member 21. Thereafter, the second table 62 is attached such that the protruding portions 24a, 24b are inserted to the positioning holes 62d, 62e of the second table 62 and the table side connector 63 is connected to the attaching portion side connector 23. The positioning and the electrical connection of the second table 62 thus can be carried out in one operation.

When the second table 62 is attached to the table attaching portion 20, the table detection portion 25 determines that the table TB attached to the table attaching portion 20 is the second table 62, and transmits the determination result to the control device 50. The control device 50 causes the Z position of the medium mounting surface 62a of the second table 62 to be adjusted by the relative moving portion 30 based on the determination result. For example, the control device 50 makes the adjustment such that the Z position of the medium mounting surface 62a of the second table 62 becomes an initial position. The initial position is stored in advance in the storage portion of the control device 50.

After the adjustment of the position of the second table 62 is completed, the medium 7 is disposed on the second table 62. Thereafter, when the activation switch of the fan 42 is turned ON, the control device 50 activates the fan 42. The activation of the fan 42 causes the decompression chamber 41K to be decompressed, and the plurality of pass-through holes 62c of the second table 62 suction the medium 7. Thus, the positional shift of the medium 7 can be suppressed even if the second table 62 is moved.

When the image data is input from the external device, for example, in this state, the control device 50 sets an initial image forming condition based on the input image data, and causes the image forming operation to be carried out according to the image forming condition. In the image forming operation, the control device 50 moves the mounting table 60 in the X direction and moves the carriage 34 in the Y direction to relatively move the ejecting unit 10 and the medium 7 in the main scanning direction and the sub-scanning direction. In this case, the control device 50 moves the second table 62 in the X direction from the far side toward the near side of the device. The control device 50 then ejects the droplet from the ejecting unit 10 to form an image on the medium 7.

Subsequently, when carrying out the three-dimensional object shaping operation again, for example, the second table 62 is detached from the table attaching portion 20, and the first table 61 is attached to the table attaching portion 20. When detaching the second table 62 from the table attaching portion 20, the second table 62 is pulled upward in the Z direction with the table attaching portion 20 regulated so as not to move in the Z direction. First, the table side connector 63 is detached from the attaching portion side connector 23. Then, the protruding portions 24a, 24b are removed from the positioning holes 62d, 62e. The suction portion 40 is then retrieved from the beam-like member 21. After the second table 62 is detached, the first table 61 is attached to the table attaching portion 20.

Therefore, the printing device 100 according to the present embodiment includes the table attaching portion 20 that replaceably attaches the respective table TB of the first table 61 for mounting the three-dimensional object 5 and the second table 62 including the medium mounting surface 62a for mounting the medium 7 and the plurality of pass-through holes 62c that pass through the medium mounting surface 62a and the back surface 62b; the ejecting unit 10 that ejects the shaping material for shaping the three-dimensional object 5 and the coloring material for coloring the three-dimensional object 5 and the medium 7 toward the table TB attached to the table attaching portion 20; the relative moving portion 30 that relatively moves the table attaching portion 20 and the ejecting unit 10 in the vertical direction and the horizontal direction; and the suction portion 40 that suctions the back surface 62b side of the second table 62 when the second table 62 is attached to the table attaching portion 20 to adsorb the medium 7 to the medium mounting surface 62a.

According to such configuration, the three-dimensional object 5 can be shaped at high accuracy by attaching the first table 61 to the table attaching portion 20 when shaping the three-dimensional object 5. Furthermore, when ejecting the coloring material to the medium 7, the first table can be replaced with the second table 62 and the second table can be attached to the table attaching portion 20. In this case, the coloring material can be ejected to the medium 7 while the medium 7 is being adsorbed to the medium mounting surface 62a by the suction portion 40, and whereby the positional shift of the medium 7 with respect to the second table 62 can be suppressed. Thus, the image can be formed at high accuracy with respect to the medium 7. Therefore, the three-dimensional object 5 can be formed at high accuracy and the image can be formed on the medium 7 at high accuracy with one device.

Furthermore, in the printing device 100 according to the present embodiment, the table attaching portion 20 includes the positioning portion 24 for positioning the space between the first table 61 and the second table 62. According to such configuration, the space between the first table 61 as well as the second table 62 and the table attaching portion 20 is positioned by the positioning portion 24, and whereby the first table 61 and the second table 62 can be attached at satisfactory accuracy even when replacing the table.

Furthermore, in the printing device 100 according to the present embodiment, the suction portion 40 is integrally arranged with the second table 62. According to such configuration, when detaching the second table 62, the second table 62 can be integrally detached with the suction portion 40. Thus, when attaching the first table 61 to the table attaching portion 20, the table attaching portion 20 can be made lighter.

Furthermore, in the printing device 100 according to the present embodiment, the second table 62 includes the table side connector 63 to be electrically connected to the suction portion 40, and the table attaching portion 20 includes the attaching portion side connector 23 at the position to be connected to the table side connector 63 when the second table 62 is attached. According to such configuration, the table side connector 63 is connected to the attaching portion side connector 23 by attaching the second table 62 to the table attaching portion 20, and hence the table attaching portion 20 side and the second table 62 side can be easily electrically connected.

Furthermore, in the printing device 100 according to the present embodiment, the suction portion 40 includes the decompression chamber 41K disposed over a region where the plurality of pass-through holes 62c are formed in the back surface 62b of the second table 62, and the fan 42 for decompressing the decompression chamber 41K. According to such configuration, the plurality of pass-through holes 62c can be suctioned with an even pressure by decompressing the decompression chamber 41K with the fan 42.

Furthermore, the printing device 100 according to the present embodiment may further include the table detection portion 25 that determines whether the table TB attached to the table attaching portion 20 is the first table 61 or the second table 62. In this configuration, for example, the operation of the user to input the table TB attached to the table attaching portion 20 becomes unnecessary by determining whether the table TB attached to the table attaching portion 20 is the first table 61 or the second table 62.

Moreover, the printing device 100 according to the present embodiment further includes the control device 50 that controls at least one of the ejecting unit 10, the table attaching portion 20, the relative moving portion 30, and the suction portion 40 based on the determination result of the table detection portion 25. According to such configuration, at least one of the ejecting unit 10, the table attaching portion 20, the relative moving portion 30, and the suction portion 40 is controlled based on the determination result of determining the table TB attached to the table attaching portion 20, and thus the shaping of the three-dimensional object 5 and the formation of the image on the medium 7 can be efficiently carried out.

Second Embodiment

Figure 9:
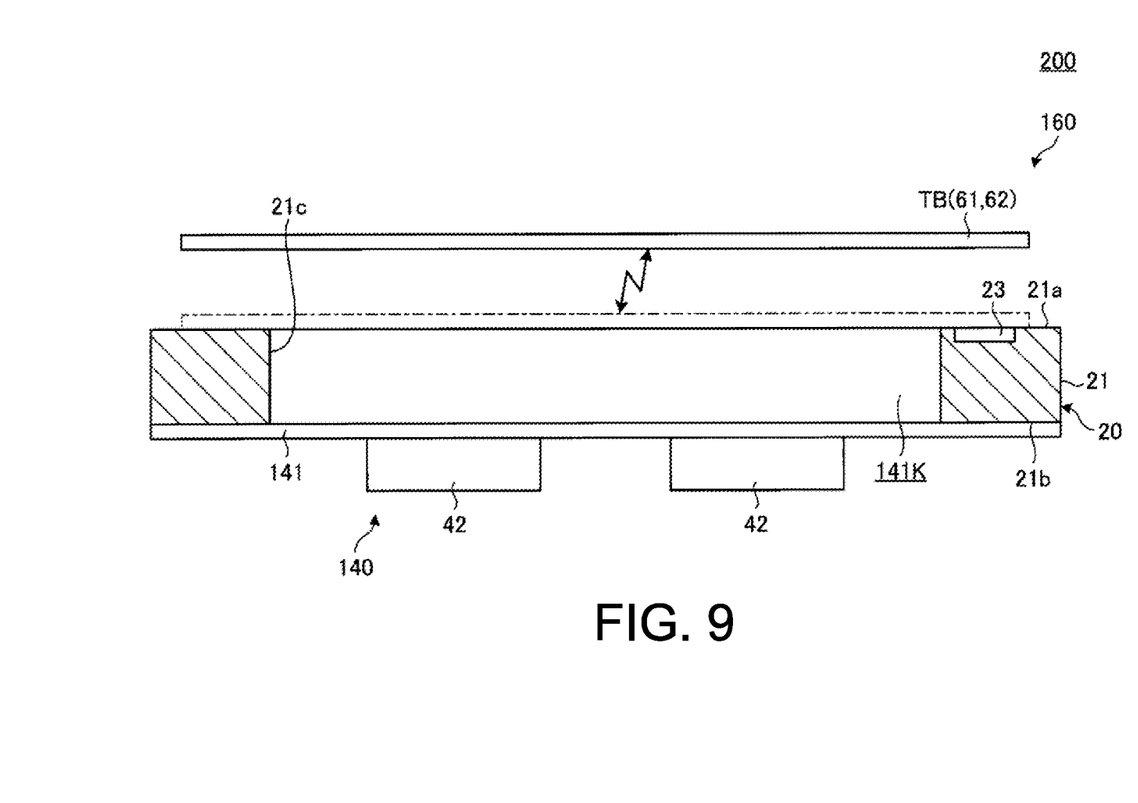
FIG. 9 is a cross-sectional view showing one example of a printing device according to a second embodiment.

A second embodiment will now be described. FIG. 9 is a cross-sectional view showing one example of a mounting table 160 in a printing device 200 according to a second embodiment. In the second embodiment, same reference numerals are denoted on the same components as those of the printing device 100 according to the first embodiment, and the description thereof will be omitted or simplified. The printing device 200 shown in FIG. 9 differs from the first embodiment in the configuration of the suction portion, and description will be made centering on such difference.

As shown in FIG. 9, a suction portion 140 according to the second embodiment is integrally arranged with the table attaching portion 20. The suction portion 140 includes a decompression chamber forming member 141 and the fan 42. The decompression chamber forming member 141 is attached to a bottom surface 21b of the beam-like member 21 configuring the table attaching portion 20. The decompression chamber forming member 141 is disposed at a position of closing an open portion of the beam-like member 21. When the second table 62 is attached to the table attaching portion 20, a decompression chamber 141K surrounded by the decompression chamber forming member 141, an inner peripheral surface 21c of the beam-like member 21, and the back surface 62b of the second table 62 is formed. In the second embodiment, a configuration may be adopted in which the decompression chamber forming member having the configuration similar to the decompression chamber forming member 41 of the first embodiment is used, and the decompression chamber forming member is fixed to the beam-like member 21.

In the printing device 200 according to the present embodiment, the suction portion 140 is integrally arranged with the table attaching portion 20. According to such configuration, the second table 62 can be made lighter as the suction portion 140 and the table attaching portion 20 are integrally arranged, and thus the attachment/detachment operation of the second table 62 can be easily carried out.

The technical scope of the present disclosure is not limited to the embodiments described above, and can be appropriately modified within a scope not deviating from the gist of the present disclosure. For example, in the embodiments described above, the configuration in which the activation switch for activating the fan 42 is arranged, and the user manually turns ON/OFF the switch when activating the fan 42 has been described by way of example, but this is not the sole case. For example, the control device 50 may control the ON/OFF of the fan 42 based on the detection result of the table detection portion 25.

For example, when detected that the table TB attached to the table attaching portion 20 is the second table 62 by the table detection portion 25, the control device 50 detects whether or not the medium 7 is mounted on the medium mounting surface 62a of the second table 62. In this case, a configuration in which a medium detection portion for detecting the medium 7 is separately disposed may be adopted, or a configuration in which the user manually inputs that the medium 7 has been mounted may be adopted.

The control device 50 turns ON the fan 42 when detected that the medium 7 has been mounted. The decompression chamber 41K is thereby decompressed, and the medium 7 is adsorbed to the medium mounting surface 62a. Thereafter, the control device 50 turns OFF the fan 42 after the image forming operation on the medium 7 is completed. For example, when the image forming operation is completed, a state in which the second table 62 is moved in the X direction from the far side to the near side of the device is obtained. The control device 50 turns OFF the fan 42 from this state to stop the decompression of the decompression chamber 41K. The adsorption of the medium 7 is thereby cancelled.

As described above, as the control device 50 automatically controls the ON/OFF of the fan 42 according to the type of table TB mounted on the table attaching portion 20 and the progress status of the image forming operation, the input work of the user can be reduced. An efficient image forming operation thus can be carried out.

What is claimed is:

1. A printing device comprising:
   a table attaching portion that replaceably attaches a respective table of a first table and a second table, wherein the first table is for mounting a three-dimensional object, and the second table includes a mounting surface for mounting a medium and a plurality of pass-through holes, which pass through the mounting surface and a back surface on an opposite side of the mounting surface;
   an ejecting unit that ejects a shaping material for shaping the three-dimensional object and a coloring material for coloring the three-dimensional object and the medium toward the table attached to the table attaching portion;
   a relative moving portion that relatively moves the table attaching portion and the ejecting unit in a vertical direction and a horizontal direction;
   a suction portion that decompresses a side of the back surface of the second table when the second table is attached to the table attaching portion to adsorb the medium to the mounting surface;
   a table detection portion that detects whether the table attached to the table attaching portion is the first table or the second table; and
   a control device that controls at least one of the ejecting unit, the table attaching portion, the relative moving portion, and the suction portion based on a detection result of the table detection portion,
   wherein the control device is configured to:
      operate the ejecting unit and the relative moving portion to perform shaping of the three-dimensional object, when the table detection portion detects the first table; and
      operate the ejecting unit, the relative moving portion and the suction portion to print on the medium, when the table detection portion detects the second table.

2. The printing device according to claim 1, wherein the table attaching portion includes a positioning portion that positions the first table and the second table.

3. The printing device according to claim 1, wherein the suction portion is arranged to be integrally connected with the second table.

4. The printing device according to claim 2, wherein the suction portion is arranged to be integrally connected with the second table.

5. The printing device according to claim 3, wherein the second table includes a table side connector configured to be electrically connected to the suction portion; and
   the table attaching portion includes an attaching portion side connector at a position configured to be electrically connected to the table side connector when the second table is attached.

6. The printing device according to claim 4, wherein the second table includes a table side connector configured to be electrically connected to the suction portion; and
   the table attaching portion includes an attaching portion side connector at a position configured to be electrically connected to the table side connector when the second table is attached.

7. The printing device according to claim 1, wherein the suction portion is arranged to be integrally connected with the table attaching portion.

8. The printing device according to claim 2, wherein the suction portion is arranged to be integrally connected with the table attaching portion.

9. The printing device according to claim 1, wherein the suction portion comprises:
   a decompression chamber disposed over a region where the plurality of pass-through hole are formed in the back surface of the second table; and
   a decompression portion which is a fan for decompressing the decompression chamber.

10. The printing device according to claim 2, wherein the suction portion comprises:
    a decompression chamber disposed over a region where the plurality of pass-through hole are formed in the back surface of the second table; and
    a decompression portion which is a fan for decompressing the decompression chamber.

11. The printing device according to claim 3, wherein the suction portion comprises:
    a decompression chamber disposed over a region where the plurality of pass-through hole are formed in the back surface of the second table; and
    a decompression portion which is a fan for decompressing the decompression chamber.

12. The printing device according to claim 5, wherein the suction portion comprises:
- a decompression chamber disposed over a region where the plurality of pass-through hole are fonned in the back surface of the second table; and
- a decompression portion which is a fan for decompressing the decompression chamber.

13. The printing device according to claim 7, wherein the suction portion comprises:
- a decompression chamber disposed over a region where the plurality of pass-through hole are formed in the back surface of the second table; and
- a decompression portion which is a fan for decompressing the decompression chamber.

* * * * *